Aug. 23, 1932.    V. BENDIX    1,872,873

BRAKE OPERATING CONNECTION

Original Filed April 16, 1928

INVENTOR
Vincent Bendix
BY H. O. Clayton
ATTORNEY

Patented Aug. 23, 1932

1,872,873

UNITED STATES PATENT OFFICE

VINCENT BENDIX OF CHICAGO, ILLINOIS, ASSIGNOR TO BENDIX BRAKE COMPANY, OF SOUTH BEND, INDIANA, A CORPORATION OF ILLINOIS

BRAKE-OPERATING CONNECTION

Original application filed April 16, 1928, Serial No. 270,184. Divided and this application filed February 28, 1929. Serial No. 343,318.

This invention relates to brakes and is illustrated as embodied in novel operating mechanism for a set of four-wheel brakes for an automobile.

The safety of a car is increased rather than decreased by the use of the regular four-wheel brake system for emergency purposes as well as for service, instead of providing additional emergency brakes. It is desirable, however, to construct the operating connections so that no failure of the connections short of a complete wreck will leave the car entirely without brakes and a single heavy cross shaft, rigidly mounted in the chassis frame and connected to all four brakes, is very effective in accomplishing the result desired. To such a shaft both hand or emergency lever and the foot or service pedal may be connected and alternatively operated. Thus all four brakes may be operated by either the emergency or service pedal.

While such a shaft is so safe and solid that the breakage of one in ordinary service has not been known to occur in all the many millions of cars heretofore built, it is my aim to eliminate the last remote chance of complete failure of the braking system by arranging for supporting and operating this shaft in such a manner that even if it should be broken the car will still have at least two brakes which are operative without any sacrifice of effectiveness. This I accomplish by providing fixed bearings for the ends of the shaft, in combination with means which will serve as a third bearing at least in case the shaft is broken, and which is arranged between the two shaft-operating connections, that is ordinarily between the connections from the pedal and the hand lever. Thus even if the shaft is broken, one end or the other of it can still be operated to apply the corresponding brakes.

The third "safety" or "emergency" bearing is preferably in the form of a bracket attached to the chassis and may be provided with a circular opening therein of greater diameter than the shaft which is passed therethrough. The bracket therefore normally does not function as bearing or support, being brought into play only upon breakage of one or both of the remaining end bearings or breakage of the shaft at either side of said "safety" bearing.

Other details of construction and desirable particular features and combinations of parts will be apparent from the following description of the illustrative embodiment shown in the accompanying drawing, in which.

Figure 1:
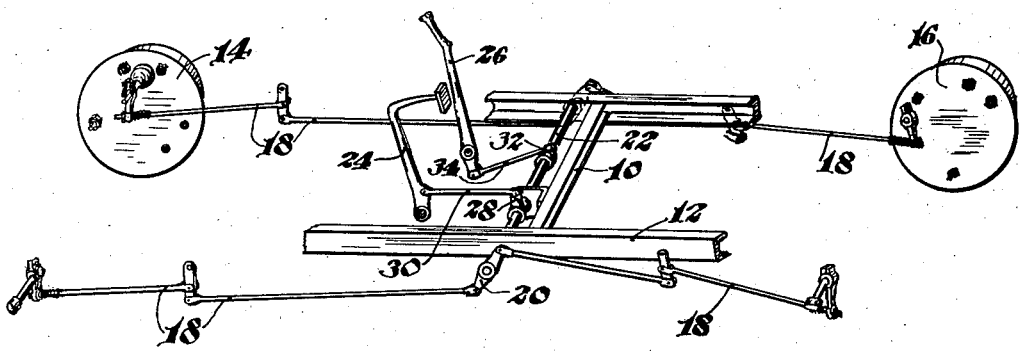
Figure 1 is a diagrammatic perspective of an automobile chassis embodying my novel invention.

The embodiment of my invention selected for illustration is shown, in Figure 1, combined with the usual chassis frame, ordinarily having one or more cross members 10 connecting the opposite side members 12, and which chassis is supported by the usual springs (not shown) on front and rear axles (not shown) which in turn are carried by road wheels (not shown) having front brakes 14 and rear brakes 16. The brakes may be operated by tension rods or cables 18 connected to form operating arms or levers 20 on a single heavy transverse cross shaft 22. The shaft may be operated by either of two operating devices, shown as a service pedal 24 and an emergency hand lever 26, the former connected to an arm 28 on the shaft by a link 30 and the latter connected to an arm 32 on the shaft by a link 34.

The present invention has to do with the supporting and arrangement of shaft 22 or its equivalent. In each instance it is rigidly mounted in the frame, preferably by means of two bearings 38 in which it is journaled adjacent its ends, and which are permanently bolted to the side frame members 12. It also has in each instance a third device adapted to serve as a bearing at least in case the shaft breaks, and which is arranged between the pedal and hand lever connections.

Figure 2:
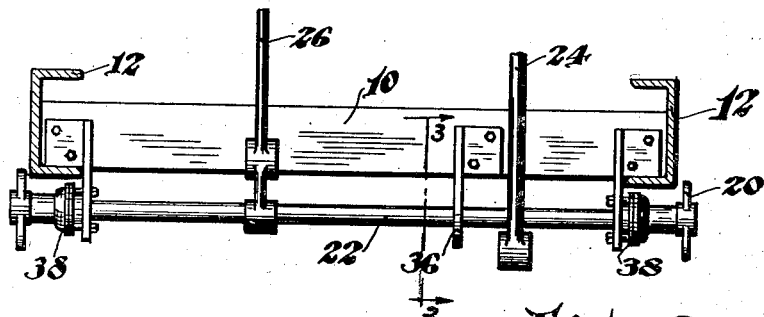
Figure 2 is a section through the chassis of Figure 1 ahead of the shaft and looking toward the rear of the car, and showing the shaft in front elevation.
Figure 3:
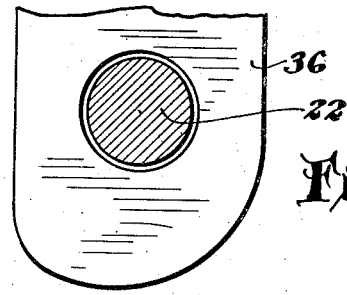
Figure 3 is a section on the line 3—3 of Figure 2, showing the lower part of the emergency bearing in side elevation.

In Figures 2 and 3 the third or "emergency" bearing is indicated in more detail and preferably comprises a right angled bracket member 36 rigidly secured to the cross member 10. That portion of the bracket extending normal to the shaft may be provided with an opening of larger cross section than the shaft which is passed therethrough, all as clearly disclosed in Figure 3.

The end bearings 38 thus serve to normally support the brake shaft, the central bearing coming into play upon failure of either or both of the said end bearings or upon failure of the shaft at either side of the central bearing. The central bearing in the disclosed structure thus serves as an "emergency" or "safety" bearing insuring that at least one set of two brakes will be at all times operative in spite of breakage of the shaft at either side of the "safety" bearing.

I prefer to mount the central bearing immediately beside arm 28, connected to pedal 24, so that the bearing takes any bending strain on the shaft from the pedal, and permits a lighter shaft to be used. The "safety" bearing, as noted above, must be between the pedal and hand lever connections, to co-operate with one or the other of the bearings 38 in case the shaft should break.

While but one embodiment of my invention has been described in detail, it is not my intention to limit the scope of the invention to that particular embodiment, or otherwise than by the terms of the appended claims.

This case constitutes a division of my co-pending application No. 270,184, filed April 16, 1928 (Patent No. 1,713,687, granted May 21, 1929).

I claim:

1. A vehicle having, in combination with a frame and a set of brakes, a shaft operating the brakes, two bearings for the shaft supported by the frame adjacent the opposite ends of the shaft, two operating devices having connections to the shaft, and a device adapted to serve as a third bearing for the shaft and which is supported by the frame between the two connections to the shaft from the two operating devices, said device having a portion encircling but normally spaced from the shaft.

2. A vehicle having, in combination with a frame and a set of brakes, a shaft operating the brakes, two bearings for the shaft supported by the frame adjacent the opposite ends of the shaft, and a device adapted to serve as a third bearing for the shaft and which is supported by the frame, said device having a portion encircling but normally spaced from the shaft.

In testimony whereof I have hereunto signed my name.

VINCENT BENDIX.